United States Patent
Halcrow et al.

(10) Patent No.: US 7,552,327 B2
(45) Date of Patent: Jun. 23, 2009

(54) METHOD AND APPARATUS FOR CONDUCTING A CONFIDENTIAL SEARCH

(75) Inventors: Michael A. Halcrow, Pflugerville, TX (US); Dustin C. Kirkland, Austin, TX (US); David B. Kumhyr, Austin, TX (US); Kylene J. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 10/713,743

(22) Filed: Nov. 13, 2003

(65) Prior Publication Data

US 2005/0120233 A1    Jun. 2, 2005

(51) Int. Cl.
*G06F 21/02* (2006.01)
*G06F 9/45* (2006.01)
*G06F 9/445* (2006.01)

(52) U.S. Cl. .................... 713/165; 713/193

(58) Field of Classification Search ......... 713/165–168, 713/183, 193
See application file for complete search history.

(56) References Cited

U.S. PATENT DOCUMENTS

| | | | | |
|---|---|---|---|---|
| 3,702,987 A | 11/1972 | Twyford | ................. | 340/172.5 |
| 4,841,570 A | 6/1989 | Cooper | ................. | 380/30 |
| 5,204,966 A | 4/1993 | Wittenberg et al. | ......... | 395/800 |
| 5,241,594 A | 8/1993 | Kung | ................. | 380/4 |
| 5,394,471 A | 2/1995 | Ganesan et al. | ............... | 380/23 |
| 5,666,415 A * | 9/1997 | Kaufman | ..................... | 713/159 |
| 5,719,941 A | 2/1998 | Swift et al. | .................... | 380/25 |
| 6,141,760 A | 10/2000 | Abadi et al. | ................. | 713/202 |
| 6,185,332 B1 * | 2/2001 | Thompson et al. | .......... | 382/186 |
| 6,327,659 B2 | 12/2001 | Boroditsky et al. | ......... | 713/182 |
| 6,470,329 B1 | 10/2002 | Livschitz | ....................... | 707/1 |
| 2002/0174355 A1* | 11/2002 | Rajasekaran et al. | ........ | 713/193 |
| 2003/0050863 A1* | 3/2003 | Radwin | ....................... | 705/27 |
| 2003/0076958 A1 | 4/2003 | Ishiguro et al. | | |
| 2003/0140258 A1 | 7/2003 | Nelson et al. | | |
| 2006/0026071 A1* | 2/2006 | Radwin | ....................... | 705/14 |

FOREIGN PATENT DOCUMENTS

| | | |
|---|---|---|
| EP | 1 1 62 531 A2 | 5/2001 |
| JP | 2001-134491 | 11/1999 |

OTHER PUBLICATIONS

Song, Dawn X. "Pratical Techniques for Searches for Encrypted Data." IEEE(2000).*
Pope, T.J., "*Password Files*," Dr. Dobbs Journal, vol. 21, No. 1, Jan. 1996, pp. 72, 74, 76, 101, and 103-104.

* cited by examiner

*Primary Examiner*—Gilberto Barron, Jr.
*Assistant Examiner*—Venkat Perungavoor

(57) ABSTRACT

The present invention provides a method and apparatus for conducting a confidential search. The method comprises accessing one or more terms associated with one or more nodes of a network, encrypting the accessed one or more terms and receiving an encrypted search term from a user. The method further comprises comparing the received encrypted search term with at least a portion of the encrypted accessed terms and providing a result of the comparison to the user.

17 Claims, 5 Drawing Sheets

METHOD AND APPARATUS FOR CONDUCTING A CONFIDENTIAL SEARCH

BACKGROUND OF THE INVENTION

1. Field of the Invention

The invention generally relates to word searches, and, in particular, to a method and apparatus for conducting a confidential search.

2. Description of the Related Art

Keyword searches on the Internet, such as on the World Wide Web ("Web"), are typically not secure. That is, communication to and from a search engine normally occurs in plain text over, for example, the Hyper Text Transmission Protocol (HTTP). Additionally, a search engine routinely records searches and results to improve its associated search algorithm, as well as to gain information about the audience to improve target advertising. Thus, even after a search is complete, the search engine may retain a copy of the terms that were searched.

In some instances, a user may wish to conduct confidential searches without having to disclose the term being searched. For example, a user who conceives of a supposedly secret term, such as a password, may wish to verify if that term is unique by searching for it on the web, and if the term is truly a secret term, the user may like to keep it a secret. In other instances, the user may wish to search for key terms without making it publicly known that the terms are being searched by the user. This may be true, for example, in the context of academic research or confidential research where the very nature of the search (based on the key words) may reveal confidential information about the searcher, which the searcher may not want to disclose publicly. A user may also desire to conduct a confidential search for prospective trademarks. Performing secure searches on the Internet (or other networks), however, can prove to be challenging because the search terms are transmitted in plain text form or because the terms are recorded by the search engine performing the search.

One way to make a search more secure is to encrypt information before transmitting it to the search engine, using, for instance, the Secure Socket Layer (SSL). For example, a user may communicate with the search engine using HTTPS (HTTP over SSL), thereby encrypting communications to make it difficult for other users to sniff the search criteria or results. HTTPS is a Web protocol developed by Netscape® that encrypts and decrypts user page requests as well as the pages that are returned by the Web server. SSL can use a 40-bit key size for the RC4stream encryption algorithm (RC4, a well-known encryption algorithm, is a variable keysize stream cipher with byte-oriented operations). While HTTPS provides some level of protection for conducting private searches, it is still an inadequate solution because the search engine itself knows both the search criteria and the results.

The present invention is directed to addressing, or at least reducing, the effects of, one or more of the problems set forth above.

SUMMARY OF THE INVENTION

In one aspect of the instant invention, a method is provided for conducting a confidential search. The method comprises accessing one or more terms associated with one or more nodes of a network, encrypting the accessed one or more terms and receiving an encrypted search term from a user. The method further comprises comparing the received encrypted search term with at least a portion of the encrypted accessed terms and providing a result of the comparison to the user.

In another aspect of the instant invention, an apparatus is provided for conducting a confidential search. The apparatus comprises a storage unit and a control unit communicatively coupled to the storage unit. The control unit is adapted to access one or more terms associated with one or more nodes of a network, store the accessed one or more terms in the storage unit and encrypt the stored one or more terms. The control unit is further adapted to receive an encrypted search term from a user, compare the received encrypted search term with the encrypted accessed terms and provide a result of the comparison over the network.

In yet another aspect of the instant invention, an article comprising one or more machine-readable storage media containing instructions is provided for conducting a confidential search. The instructions, when executed, enable a processor to access one or more terms associated with one or more nodes of a network, encrypt the accessed one or more terms and receive an encrypted search term from a user. The instructions, when executed further enable a processor to compare the received encrypted search term with the encrypted accessed terms and provide a result of the comparison to the user.

In yet another aspect of the instant invention, a system is provided for conducting a confidential search. The system comprises a first processor-based system and a second processor-based system. The first processor-based system is adapted to provide an encrypted search term. The second processor-based system is adapted to access one or more terms associated with one or more nodes of a network, encrypt the accessed one or more terms and receive the encrypted search term from the first processor-based system. The second processor-based systems is further adapted to compare the received encrypted search term with the encrypted accessed terms and providing a result of the comparison to the first processor-based system.

BRIEF DESCRIPTION OF THE DRAWINGS

The invention may be understood by reference to the following description taken in conjunction with the accompanying drawings, in which like reference numerals identify like elements.

Figure 1:
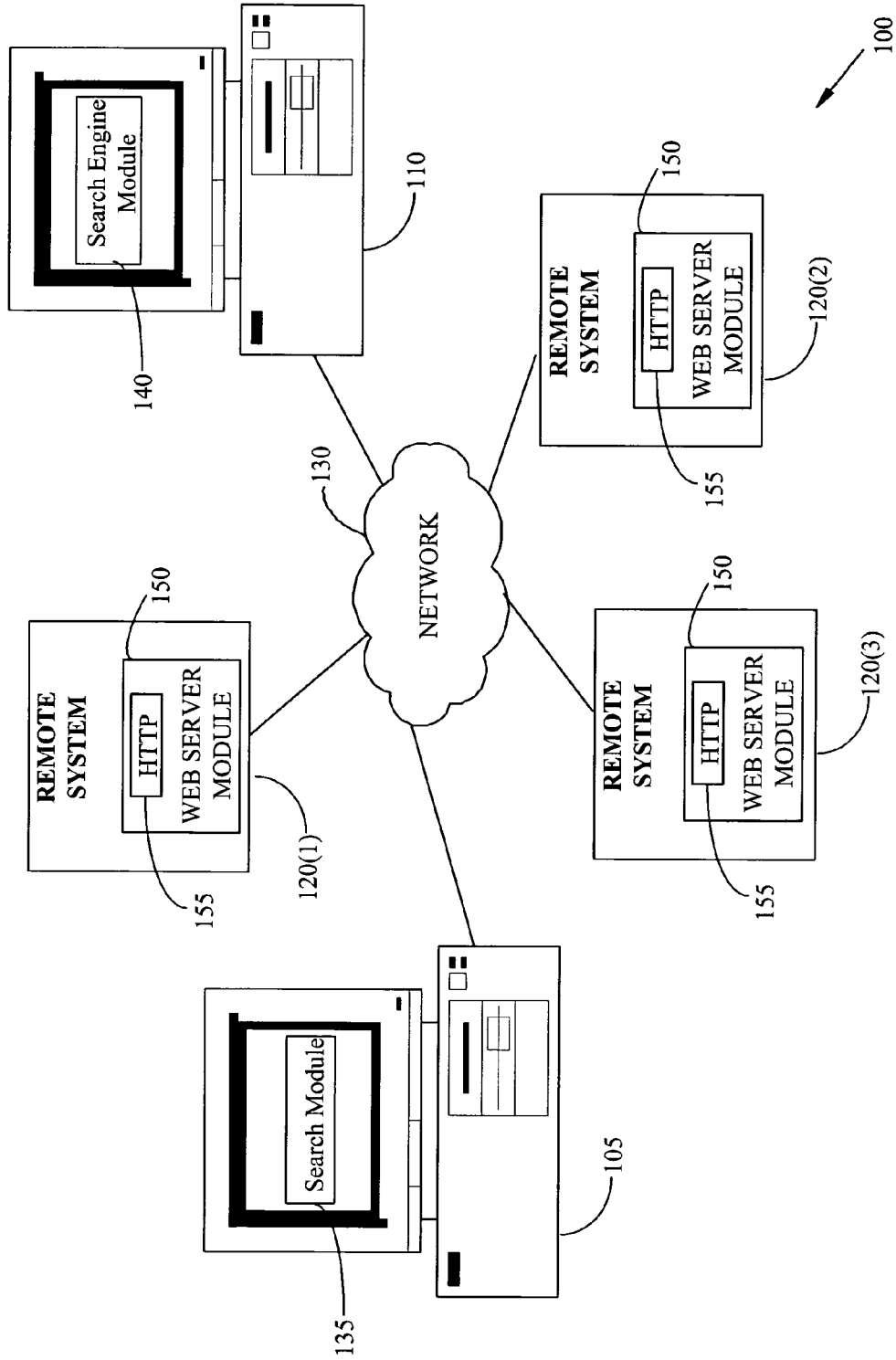
FIG. 1 is a block diagram of an embodiment of a communications system including a search engine that is capable of searching a network for selected words.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a communications system 100 is illustrated in accordance with one embodiment of the present invention. As discussed in greater detail below, the communications system 100 allows users to search words (or terms) on a network (or a database) in a substantially confidential manner.

The communications system 100 includes a plurality of processor-based systems 105, 110, 120(1-3) that may be communicatively coupled by a network 130, such as by a private network or a public network (e.g., the Internet). The systems 105, 110, and 120(1-3) may be any variety of processor-based systems that are capable of communicating with each other, and may include, but are not limited to, computers, portable electronic devices, Internet appliances, and the like. Although not shown, the various systems 105, 110, and 120 (1-3) may be coupled to the network 130 through a router (not shown), gateway (not shown), or by other intervening, suitable devices.

In the illustrated embodiment, the system 105 includes a search module 135 that allows a user to input one or more search terms that can be provided to a search engine module 140 of the system 110. The search module 135, in one embodiment, encrypts the search term using a one-way encryption algorithm before it is transmitted to a search engine module 140, which then compares the encrypted search term to other encrypted terms accessible to the search engine. Because the search is conducted based on an encrypted search term provided by the user, as opposed to being based on the plain text form of that search term, the user can perform the search while keeping the original search term relatively confidential.

In FIG. 1, the search engine module 140 maintains a database of select words that may be found on the network 130.

For example, the search engine module 140, in one embodiment, may search and maintain a database of words that are found at websites or in files associated with the various systems 120(1-3) that are coupled to the network 130. The systems 120(1-3) may be considered as various nodes on the network 130 that may have an associated website that can be searched for contents. The words found during a search and stored in the database may also contain an associated location identifying where those words can be found on the network 130. A flow diagram of how the search engine module 140 may generate a database of words is described later with reference to FIG. 2. Once created, the database may be searched by the users on the network 130. The search engine module 140 may, from time to time, update the database as the contents of the various websites on the network 130 change.

In the illustrated embodiment, the systems 120(1-3) include a web server module 150, which may be capable of receiving requests over the network 130 and responding to such requests. For example, the web server module 150 may include an HTTP (Hypertext Transfer Protocol) service routine 155 that is capable of receiving HTTP requests over the network 130, as well as sending HTTP responses over the network 130. HTTP specifies how a client and server may establish a connection, how the client may request data from the server, how the server may respond to the request, and how the connection may be closed. One version of HTTP is described in RFC 2068 entitled "Hypertext Transfer Protocol—HTTP/1.1," dated January 1997. In an alternative embodiment, the HTTPS protocol may also be employed. The systems 120(1-3) may host one or more websites that can be accessible by the search engine module 140 of the system 110. As noted, the search engine module 140 may search the websites for various words and generate a searchable database.

The network 130 of FIG. 1 may be a packet-switched data network, such as a data network according to the Internet Protocol (IP). Examples of the network 130 may include local area networks (LANs), wide area networks (WANs), intranets, and the Internet. One version of IP is described in Request for Comments (RFC) 791, entitled "Internet Protocol," dated September 1981. Other versions of IP, such as IPv6 or other connectionless, packet-switched standards may also be utilized in further embodiments. A version of IPv6; is described in RFC 2460, entitled "Internet Protocol, Version 6; (IPv6) Specification," dated December 1998. The data network 130 may also include other types of packet-based data networks in further embodiments. Examples of such other packet-based data networks include Asynchronous Transfer Mode (ATM), Frame Relay networks and the like.

As utilized herein, a "network" may refer to one or more communications networks, channels, links, or paths, and systems or devices (such as routers) used to route data over such networks, channels, links, or paths.

The various modules 135, 140, 150 illustrated in FIG. 1 are implemented in software, although in other implementations these modules may also be implemented in hardware or a combination of hardware and software.

It should be understood that the configuration of the communications system 100 of FIG. 1 is exemplary in nature, and that fewer, additional, or different components may be employed in other embodiments of the communications system 100. For example, in one embodiment, although not shown in FIG. 1, the systems 105 and 110 may include the web server module 150 and HTTP service routine 155. While the communications system 100 in the illustrated example includes five processor-based systems 105, 110, 120(1-3), in other embodiments, the number of systems employed may be more or fewer. In one embodiment, the search module 135 and the search engine module 140 may reside in the same system. Similarly, other configurations may be made to the communications system 100 without deviating from the spirit and scope of the invention.

Figure 2:
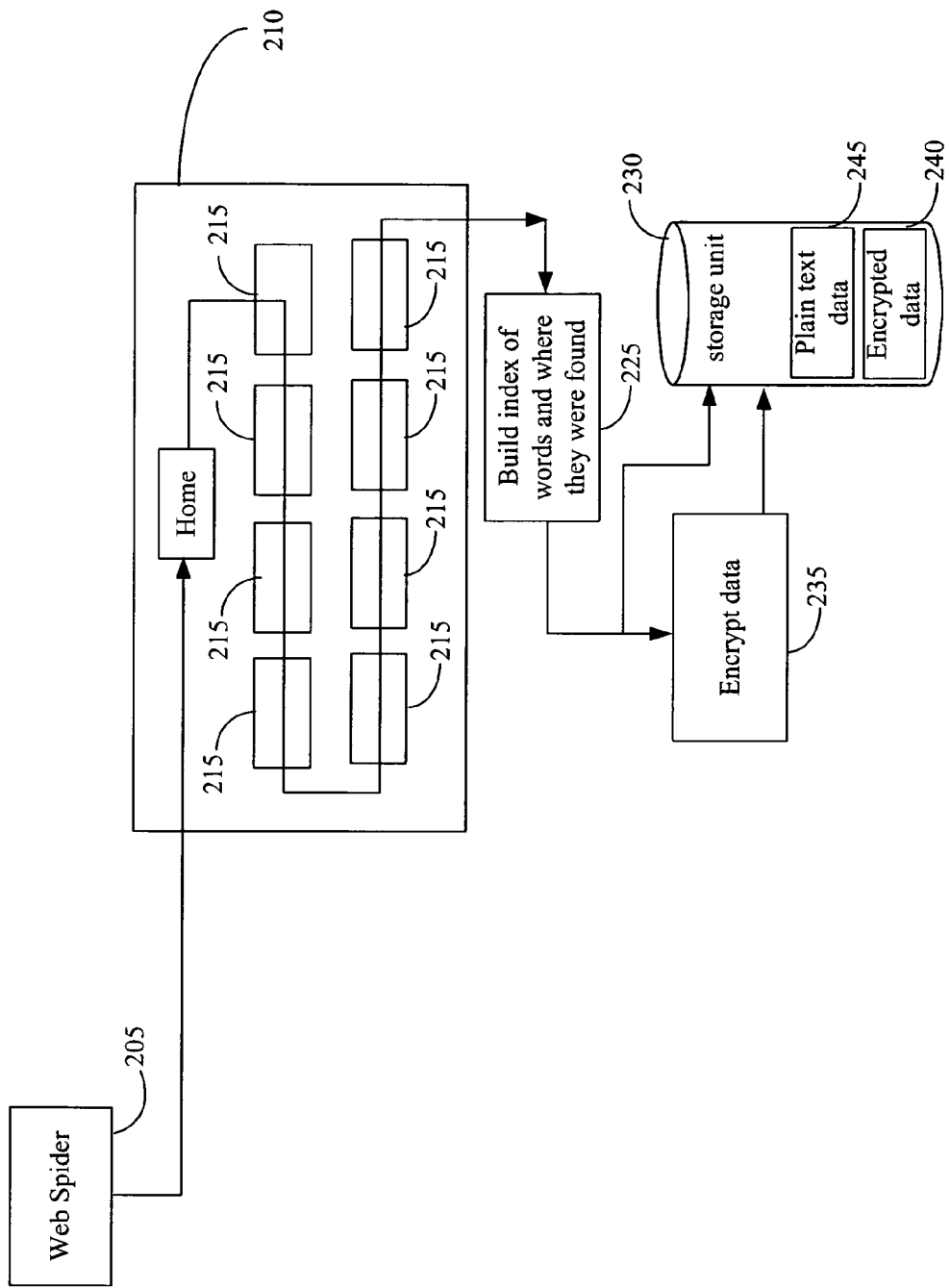
FIG. 2 illustrates one way the search engine of FIG. 1 may search for terms on the network, in accordance with one embodiment of the present invention.

FIG. 2 illustrates a flow diagram illustrating at least one operation performed by the search engine module 140 of FIG. 1. In particular, the search engine module 140 is shown generating a database of words found on the network 130, in accordance with one embodiment of the present invention. Although not so limited, for ease of illustration, it is herein assumed that the network 130 is the Internet, and the search engine module 140 is a World Wide Web search engine. Generally, the search engine module 140 may employ software tools, sometimes referred to as "spiders," to build and maintain a database of words found on the web sites. The spider, shown as block 205 in FIG. 2, accesses one or more webpages 210 on the network 130 and builds a list of words based on the contents of the webpages 210.

Those skilled in the art should appreciate that the path that the spider 205 takes in searching the Internet for words may vary from one implementation to another. In FIG. 2, for example, the spider 205 uses the webpage 210 as its starting point to search for words, and then follows various hyperlinks 215 found on the webpage 210 to access other web sites. In this way, the spider 205 quickly begins to travel, spreading out across the more widely used portions of the web to build and/or update the database of words. Of course, in other embodiments, other database building and updating techniques may be employed without deviating from the spirit and scope of the present invention.

In FIG. 2, when the spider 205 searches the webpage 210, it takes notes of at least two things—the words within the page, and the location where the words were found. The search engine module 140 builds (at block 225) an index of the words and their respective location. The index of words may be stored in a storage unit 230 in plain text form and/or encrypted form. In accordance with one embodiment of the present invention, the search engine module 140 encrypts (at block 235) the found words before storing them in a database 240. In the illustrated embodiment, the search engine module 140 employs the same encryption algorithm that is employed by the search module 135 (see FIG. 1) to encrypt search term(s) before they are provided to the search engine module 140. The plain text form of the found words may be stored in a database 245.

In one embodiment, the encrypted database 240 may be generated based on the database 245 containing plain-text data. That is, the search engine module 140 may first build the database 245 containing plain text data, and then apply the desired encryption algorithm to the contents of database 245 to generate the second database 240 having encrypted data stored therein.

Figure 3:
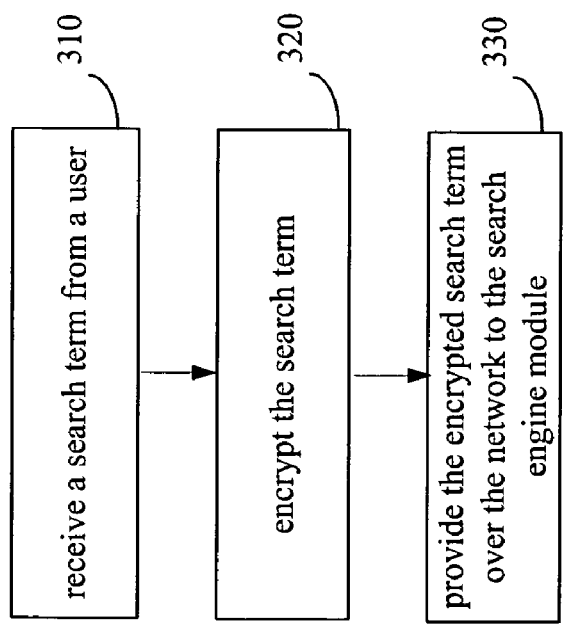
FIG. 3 illustrates a flow diagram of a search module that may be implemented in the communications system of FIG. 1, in accordance with one embodiment of the present invention.

Referring now to FIG. 3, a flow diagram of at least one aspect of the search module 135 of FIG. 1 is illustrated, in accordance with one embodiment of the present invention. The search module 135 receives (at 310) a search term from the user. The search term may be a word or a combination of words that the users desire to search on the network 130. The search module 135 encrypts (at 320) the received search term. Any one of a variety of suitable encryption methodologies can be employed to encrypt the search term. For example, the search module 135 may apply a one-way hash function on the search term, thereby making it difficult to derive the original text from the hashed string. Examples of hashing algorithms may include, but are not limited to, MD5; and SHA-1; hashing algorithms. In an alternative embodiment, an asymmetric encryption algorithm may be employed to encrypt the search term. An asymmetric encryption algorithm commonly entails mapping from message (or plain text) space to cipher space using a first key, which, for example, may be a public key. Typically, asymmetric encryption involves a one-to-one mapping from the message space into the cipher space, where the cipher space mapping is reversible into the message space using a second key, which, for example, may be a secret or a non-public key. If asymmetric encryption is employed in the instant invention, then, in one embodiment, the search module 135 and the search engine module 140 may each have access to the public key to perform the desired encryption feature. The search module 135 provides (at 330) the encrypted search term over the network 130 to the search engine module 140.

Figure 4:
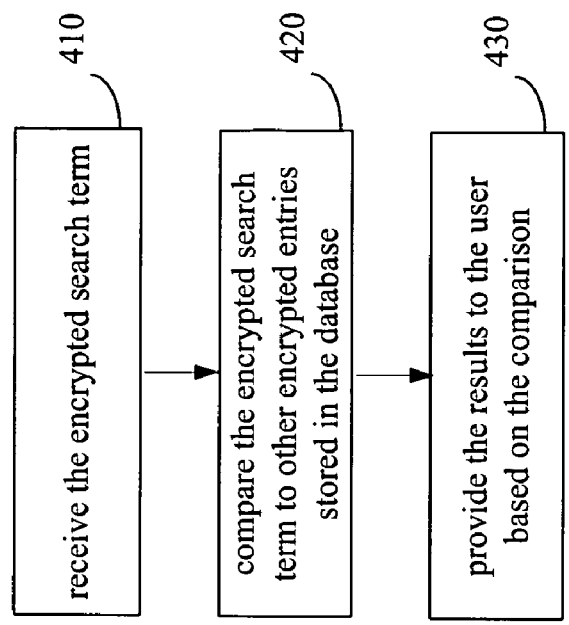
FIG. 4 depicts a flow diagram depicting a confidential search in the communications system of FIG. 1, in accordance with one embodiment of the present invention.

Referring now to FIG. 4, one embodiment of a flow diagram for performing a confidential search is illustrated using the search engine module 140 of FIG. 1. The search engine module 140 receives (at 410) the encrypted search term that is provided by the search module 135 at block 330 of FIG. 3. The search engine module 140 compares (at 420) the encrypted search term to other encrypted entries stored in the database (see element 240 of FIG. 2). Based on the comparison, the search engine module 140 provides (at 330) the results to the user in plain text form. For example, if no matches are found, the search engine module 140 may indicate as such. On the other hand, if the search term matches one or more of the entries stored in the database 240, the search engine module 140 displays to the user any results that matched the search criteria.

As described above, one or more embodiments allow a user to search for a term on the network 130 (see FIG. 1) without having to publicly disclose the search term. The present invention may be useful in a variety of applications where the user may desire that the search term remain a secret or where the user may wish to search for key terms without making it publicly known that the terms were being searched by the user. One application of the present invention may be illustrated with reference to an example in which a user conceives of a word that the user believes would make a good password, and the user desires to test the strength of that password. One method of gauging the strength of the password is to check it against a large database of known words. Aside from a dictionary, the World Wide Web is another good source of a database with a large number of words. However, as described above, using a conventional search engine to search the Web may not be desirable to the user because the original password would have to be revealed to the search engine module 140, which is likely to save a copy of the searched term (e.g., the password, in this example) to improve its own database. As a result of this public disclosure, the value of the secret password may be reduced, particularly if that term was not previously known on the Web.

As discussed above, one or more embodiments of the present invention allow the user to search the network 130 without having to reveal the password to the public. To conduct the confidential search, the user may utilize the search module 135 to encrypt the password before the encrypted password is provided to the search engine module 140. The search engine module 140, upon receiving the encrypted search term, attempts to match the user's encrypted password against the encrypted words stored in the database. If matches are found, they are returned to the user, indicating that the password is known to others on the Web, thereby suggesting to the user that the strength of the password is relatively weak, as it may be broken using a dictionary attack (a common scheme employed to break passwords). On the other hand, if no matches are returned, the user knows that the password does not exist in the search engine module's database, and is a relatively strong password.

In the context of the above illustrated example, the search module 135 (see FIG. 1) of the system 105 may be implemented as part of, or in association with, the "passwd" program available in the Unix/Linux environment. The "passwd" program, which can be used to change user passwords, has built-in capability to assess the strength of passwords that are entered by the user. In one embodiment, the search module 135 may be utilized on the backend of the "passwd" program such that the search module 135 encrypts the entered passwords and transmits them to the search engine module 140 for comparison against other terms known on the network 130.

Figure 5:
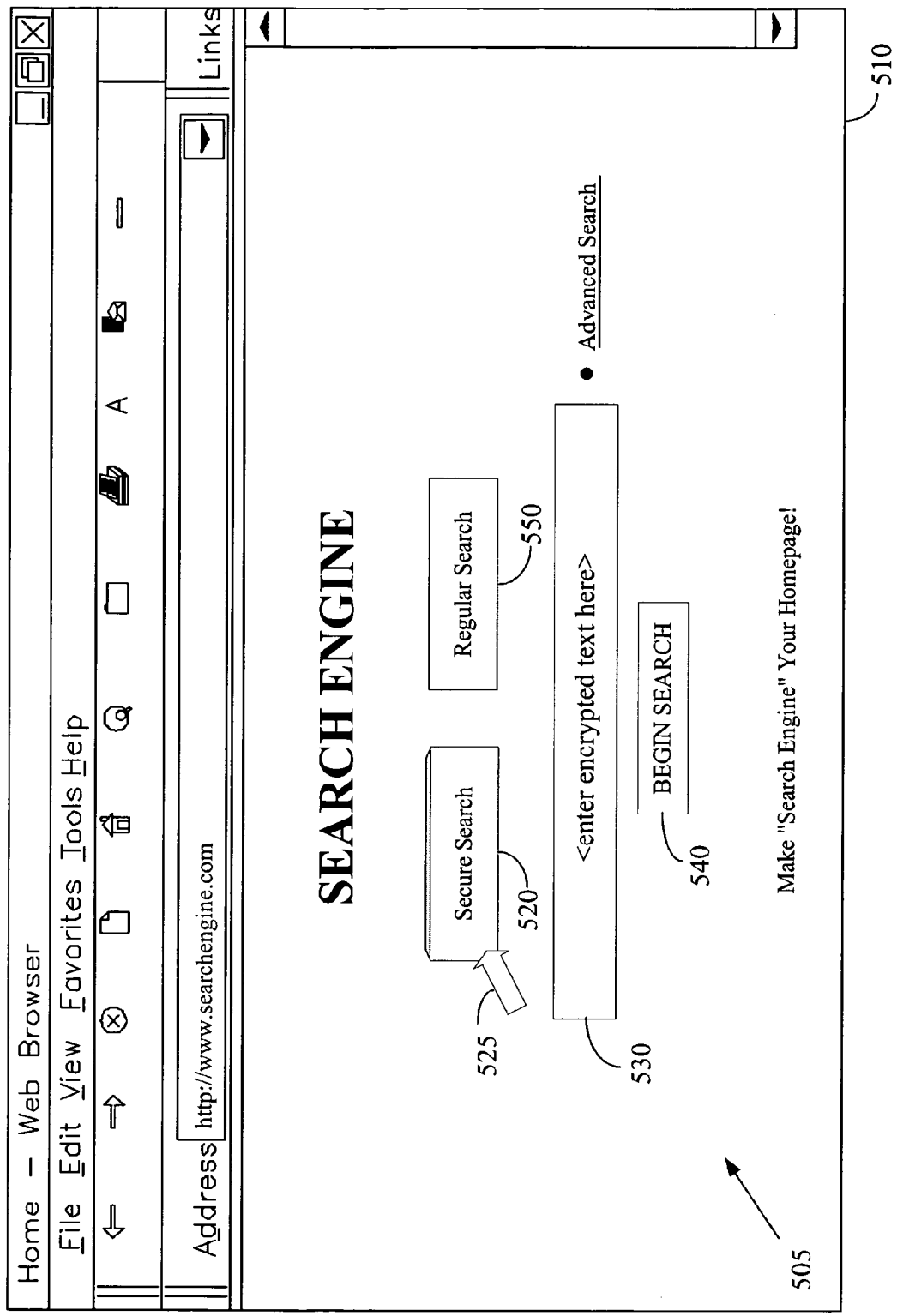
FIG. 5 illustrates an exemplary webpage associated with the search engine module of FIG. 1.

Referring now to FIG. 5, an exemplary webpage 505 of the search engine module 140 is illustrated through which users may search for terms on the network 130. The webpage 505, which is a Hypertext Markup Language (HTML) file, may contain one or more hyperlinks to other pages. The exemplary webpage 505 of FIG. 5 may be accessed from the system 105 of FIG. 1 using, for example, a web browser. For illustrative purposes, the webpage 505 is shown in a web browser window 510.

In accordance with one embodiment of the present invention, the search engine module 140 of FIG. 1 allows users to search for terms in two modes—a regular mode and a secure mode. A user desiring to conduct a confidential search, may select the "secure search" option 520 using, for example, a mouse cursor 525, and then enter the search term in its encrypted form in a field 530. To initiate the search, the user may select the "begin search" button 540. The search engine module 140 may then compare the entered search term with other encrypted values of the terms stored in the database 240 (see FIG. 2), and thereafter display the search results to the user.

A user may also use the webpage 505 to conduct regular (non-confidential) searches by selecting the "regular search" option 550 using the mouse cursor 525. In the regular search mode 550, the search engine module 140 performs a conventional search for the user in plain text form. The results may be displayed once the user selects the "begin search" button 540 after having entered the search criteria in the field 530. The search engine module 140 then compares the entered search term with other plain text terms stored in the database 245 (see FIG. 2), and thereafter displays the search results to the user.

Depending on the implementation, allowing users to conduct confidential searches can tend to be computationally expensive in some instances. For this reason, it may be advantageous to offer this feature as a premium service with an associated service charge being assessed to the user.

Figure 6:
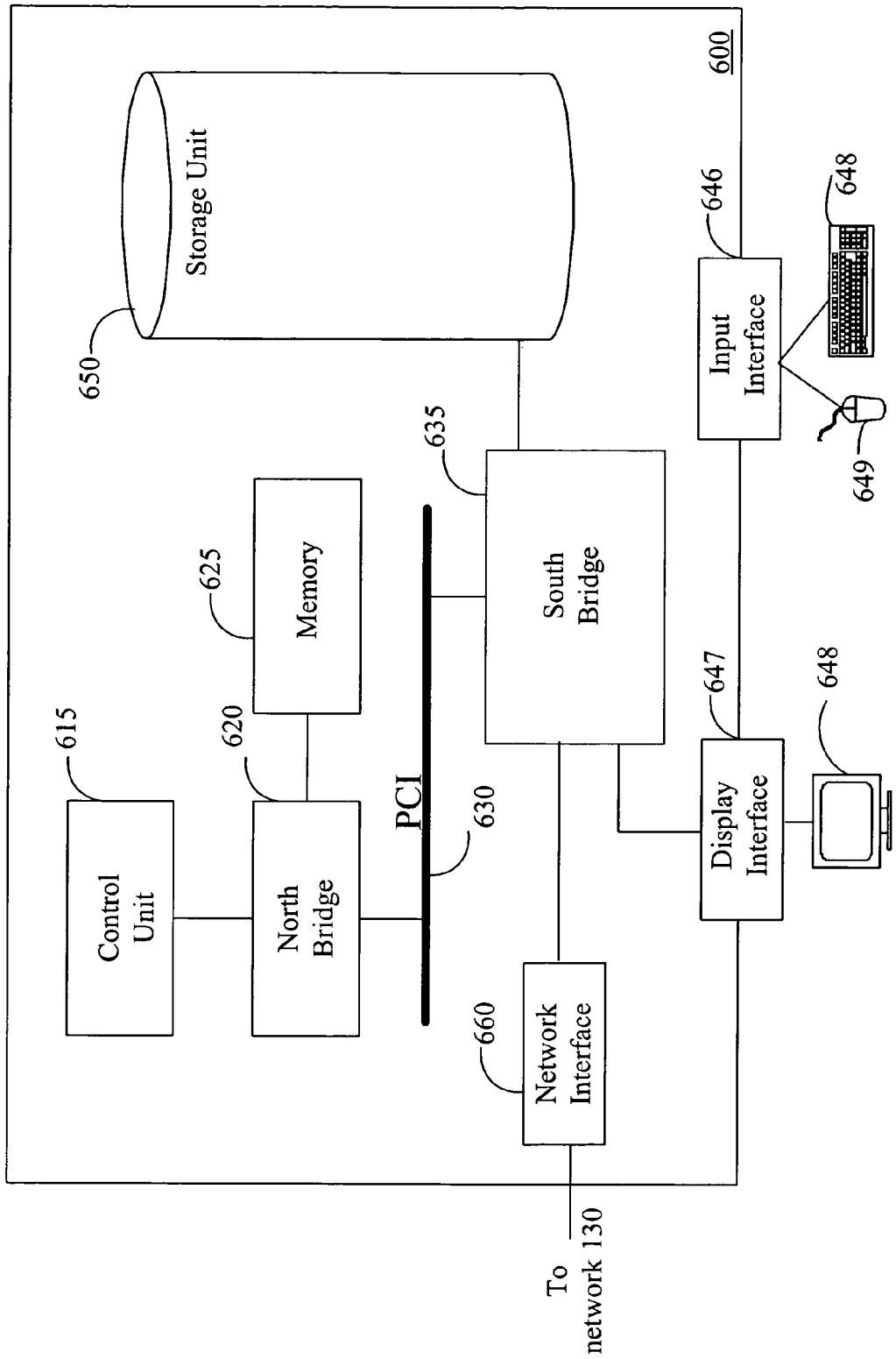
FIG. 6 depicts a block diagram of a processor-based system that may be implemented in the communications system of FIG. 1, in accordance with one embodiment of the present invention.

Referring now to FIG. 6, a stylized block diagram of a system 600 that may be implemented in the communications system of FIG. 1 is illustrated, in accordance with one embodiment of the present invention. That is, the system 600 may represent one embodiment of the system 105, system 110, and/or system 120, with each system being configured with the appropriate software configuration or configured with the appropriate modules 135, 140, 150. The system 600 comprises a control unit 615, which in one embodiment may be a processor that is capable of interfacing with a north bridge 620. The north bridge 620 provides memory management functions for a memory 625, as well as serves as a bridge to a peripheral component interconnect (PCI) bus 630. In the illustrated embodiment, the system 600 includes a south bridge 635 coupled to the PCI bus 630.

A storage unit 650 is coupled to the south bridge 635. The software installed in the storage unit 650 may depend on the features to be performed by the system 600. For example, if the system 600 is implemented as the system 105 of FIG. 1, then the storage unit 650 may include the search module 135. If the system 600 is implemented as the system 105 of the FIG. 1, then the storage unit 650 may include at least the search engine module 140. If the system 600 is implemented as the system 120, then the storage unit 650 may include the web server module 150. The modules 135, 140, 150 may be executable by the control unit 615. Although not shown, it should be appreciated that in one embodiment an operating system, such as Windows®, Disk Operating System®, Unix®, OS/2®, Linux®, MAC OS®, or the like, may be stored on the storage unit 650 and executable by the control unit 615. The storage unit 650 may. also include device drivers for the various hardware components of the system 600.

In the illustrated embodiment, the system 600 includes a display interface 647 that is coupled to the south bridge 635. The system 600 may display information on a display device 648 via the display interface 647. The south bridge 635 of the system 600 may include a controller (not shown) to allow a user to input information using an input device, such as a keyboard 648 and/or a mouse 649, through an input interface 646.

The south bridge 635 of the system 600, in the illustrated embodiment, is coupled to a network interface 660, which may be adapted to receive, for example, a local area network card. In an alternative embodiment, the network interface 660 may be a Universal Serial Bus interface or an interface for wireless communications. The system 600 communicates with other devices coupled to the network 130 through the network interface 660. Although not shown, associated with the network interface 660 may be a network protocol stack, with one example being a UDP/IP (User Datagram Protocol/Internet Protocol) stack. UDP is described in RFC 768, entitled "User Datagram Protocol," dated August 1980. In one embodiment, both inbound and outbound packets may be passed through the network interface 660 and the network protocol stack.

It should be appreciated that the configuration of the system 600 of FIG. 6 is exemplary in nature and that, in other embodiments the system 600 may include fewer, additional, or different components without deviating from the spirit and scope of the present invention. For example, in an alternative embodiment, the system 600 may not include a north bridge 620 or a south bridge 635, or may include only one of the two bridges 620, 635, or may combine the functionality of the two bridges. As another example, in one embodiment, the system 600 may include more than one control unit 615. Similarly, other configurations may be employed consistent with the spirit and scope of the present invention.

The various system layers, routines, or modules may be executable control units (such as control unit 615 (see FIG. 6). The control unit 615 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 615 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing one or more terms associated with one or more nodes of a network, wherein the one or more terms are contained in one or more hypertext markup files stored in one or more workstations coupled to the network, wherein the network is the Internet;
   encrypting the accessed one or more terms;
   storing, in a storage unit, a data-collection program that builds and maintains a database of the encrypted terms;
   receiving an encrypted search term from a user of a remote device;
   accessing the storage unit of an Internet web server comprising a World Wide Web search engine module to retrieve one or more of the encrypted accessed terms in response to receiving the encrypted search term from the user of the remote device;
   comparing the received encrypted search term with at least a portion of the retrieved one or more encrypted accessed terms; and
   providing a result of the comparison to the user.

2. The method of claim 1, wherein encrypting comprises encrypting the accessed one or more terms using a same encryption algorithm as that employed to encrypt the search term.

3. The method of claim 2, wherein encrypting comprises encrypting the accessed terms using at least one of a one-way hash function and an asymmetric encryption algorithm.

4. The method of claim 1, further comprises storing the encrypted accessed terms in a database and wherein comparing comprises comparing the received encrypted search term with at least a portion of the encrypted accessed terms stored in the database.

5. The method of claim 1, wherein providing the result comprises providing at least a portion of the accessed terms that substantially match the search term.

6. The method of claim 1, further comprising storing the accessed terms in a first database and storing the encrypted accessed terms in a second database, and further comprising providing the user an option to search the first database or the second database.

7. An article comprising one or more machine-readable storage media containing instructions that when executed enable a processor to:
   access one or more terms associated with one or more remote files over a network, wherein the one or more terms are contained in one or more hypertext markup files stored in one or more workstations coupled to the network, wherein the network is the Internet;
   encrypt the accessed one or more terms;
   store, in a storage unit, a data-collection program that builds and maintains a database of the encrypted terms;
   receive an encrypted search term from a user of a remote device;
   access the storage unit of an Internet web server comprising a World Wide Web search engine module to retrieve one or more of the encrypted accessed terms in response to receiving the encrypted search term from the user of the remote device;
   compare the received encrypted search term with the retrieved one or more encrypted accessed terms; and
   provide a result of the comparison to the user.

8. The article of claim 7, wherein the network is the Internet, and wherein the instructions when executed enable the processor to encrypt the accessed terms using a same algorithm utilized to encrypt the search term.

9. The article of claim 8, wherein the instructions when executed enable the processor to encrypt the accessed terms using at least one of a one-way hash function and an asymmetric algorithm.

10. The article of claim 7, wherein the instructions when executed enable the processor to store the encrypted accessed terms in a database and to compare the received encrypted search term with at least a portion of the encrypted accessed terms stored in the database.

11. The article of claim 7, wherein the instructions when executed enable the processor to access one or more websites associated with one or more processor-based systems that are communicatively coupled to the Internet and to provide the results of at least a portion of the accessed terms that match the search term.

12. The article of claim 7, wherein the instructions when executed enable the processor to store the accessed terms in a first database, store the encrypted accessed terms in a second database, and provide the user an option to search the first database or the second database.

13. An apparatus, wherein the apparatus is an Internet web server comprising a World Wide Web search engine module, comprising:
    a storage unit; and
    a control unit communicatively coupled to the storage unit, the control unit adapted to:
      access one or more terms associated with one or more remote files over a network, wherein the one or more files are hypertext markup files stored in one or more workstations coupled to the network, and wherein the network is the Internet;
      store the accessed one or more terms in the storage unit, wherein the storage unit is adapted store a data-collection program, that when executed, enables the control unit to build and maintain a database of the encrypted accessed terms, wherein the accessed terms are found in the one or more hypertext markup files;
      encrypt the stored one or more terms in the storage unit;
      receive an encrypted search term from a user of a remote device;
      access the storage unit to retrieve one or more of the encrypted accessed terms in response to receiving the encrypted search term from the user of the remote device;
      compare the received encrypted search term with the retrieved one or more encrypted accessed terms; and
      provide a result of the comparison over the network.

14. The apparatus of claim 13, wherein the control unit is adapted to encrypt the accessed one or more terms using a same encryption algorithm as that employed to encrypt the search term.

15. The apparatus of claim 14, wherein the control unit is adapted to encrypt the accessed terms using at least one of a one-way hash function and an asymmetric encryption algorithm.

16. The apparatus of claim 13, wherein the control unit is further adapted to compare the received encrypted search term with at least a portion of the encrypted accessed terms stored in the database.

17. The apparatus of claim 13, wherein the control unit is adapted to provide the result that includes at least a portion of the accessed terms that substantially match the search term, and wherein the control unit is further adapted to store the accessed terms in a first database, store the encrypted accessed terms in a second database, and provide the user an option to search the first database or the second database.

* * * * *